United States Patent [19]

Zeunen et al.

[11] E Re. 28,770

[45] Reissued Apr. 13, 1976

[54] PHOTOGRAPHIC EXPOSURE APPARATUS

[75] Inventors: Barthel Zeunen, Clarkston; Rex C. Grace, Troy; Alvie R. Dunn, Madison Heights, all of Mich.

[73] Assignee: Capitol Reproductions, Inc., Madison Heights, Mich.

[22] Filed: Nov. 15, 1974

[21] Appl. No.: 524,000

Related U.S. Patent Documents

Reissue of:

[64] Patent No.: 3,723,001
Issued: Mar. 27, 1973
Appl. No.: 69,404
Filed: Sept. 3, 1970

[52] U.S. Cl. ..... 355/84; 355/99
[51] Int. Cl.[2] ..... G03B 27/10
[58] Field of Search ..... 355/78, 79, 84, 85, 99, 355/103, 113

[56] References Cited

UNITED STATES PATENTS

| | | | |
|---|---|---|---|
| 2,518,208 | 8/1950 | Weiss | 355/84 |
| 2,550,640 | 4/1951 | Frantz | 355/84 |
| 3,254,586 | 6/1966 | Haus | 355/84 |
| 3,303,763 | 2/1967 | Kent et al. | 355/10 |
| 3,385,192 | 5/1968 | Qwarfort | 355/84 |
| 3,655,970 | 4/1972 | Betzler | 355/84 X |

*Primary Examiner*—Richard A. Wintercorn
*Attorney, Agent, or Firm*—Hauke, Patalidis & Dumont

[57] ABSTRACT

A portable photographic exposure apparatus for making reproductions of loft drawings, body drafts or the like directly from the drawing table on which the drawing is made. A wheeled cabinet structure has a horizontal supporting surface, the height of which is adjustable to the height of a drawing table, with an exposure unit adapted to be mounted on the supporting surface and containing a light source, a set of electric motor driven wheels, and a source of static electricity. The exposure unit is driven over the drawing table to expose a sheet of film which is laid over the drawing on the drawing table to reproduce the drawing. Static electricity projected by the exposure unit presses the film firmly against the drawing to be reproduced. The electric motor is reversible to return the exposure unit to its supporting cabinet. The apparatus may also be used to expose a negative which is subsequently processed to provide positive reproductions of the loft drawing.

14 Claims, 8 Drawing Figures

PHOTOGRAPHIC EXPOSURE APPARATUS

Matter enclosed in heavy brackets [ ] appears in the original patent but forms no part of this reissue specification; matter printed in italics indicates the additions made by reissue.

BACKGROUND OF THE INVENTION

1. Description of the Prior Art

In the reproduction of large metal or synthetic sheet loft drawings and body drafts, it is customary to ship the completed drawings to a special facility for photographic processing to make the necessary reproductions. Drawings of this nature are generally made on large sheets of suitably coated aluminum, synthetic sheets or the like and the shipping and handling for purposes of making reproductions is a relatively expensive process, particularly as the risk of damage and the possibility of temperature and humidity changes may cause distortions. Portable exposure machines have been proposed heretofore, such as are disclosed in U.S. Pat. Nos. 2,292,668; 2,550,640; 3,254,586; and 3,385,192. However, such machines involve transportation problems if it is desired to use them at multiple locations, and they still do not readily serve to maintain close contact between the film and the drawing for accurate reproduction.

2. Field of the Invention

This invention relates to improvements in portable photographic exposure apparatus of the type generally used to expose large sheets of film which are laid on large loft drawings, body drafts and the like for production of accurate photographic reproductions.

SUMMARY OF THE INVENTION

The present invention contemplates an improved portable exposure unit which can be used to make positive reproductions of drawings of this type directly from the drawing table on which the drawing is made, thereby eliminating the expensive shipping and handling of the drawing. The film used with this apparatus may consist of commercially available material such as "Mylar" or other similar dimensionally stable material having a light sensitive coating thereon to provide a reproduction when exposed over the drawing. Such film lends itself to being pinned to the drawing by an electrostatic charge which according to the present invention is projected from an electrode carried directly by the exposure unit.

DESCRIPTION OF THE DRAWINGS

For a more complete understanding of the invention, reference may be had to the accompanying drawings illustrating a preferred embodiment of the invention in which like reference characters refer to like parts through out the several views, and in which.

DESCRIPTION OF THE PREFERRED EMBODIMENT

Figure 1:
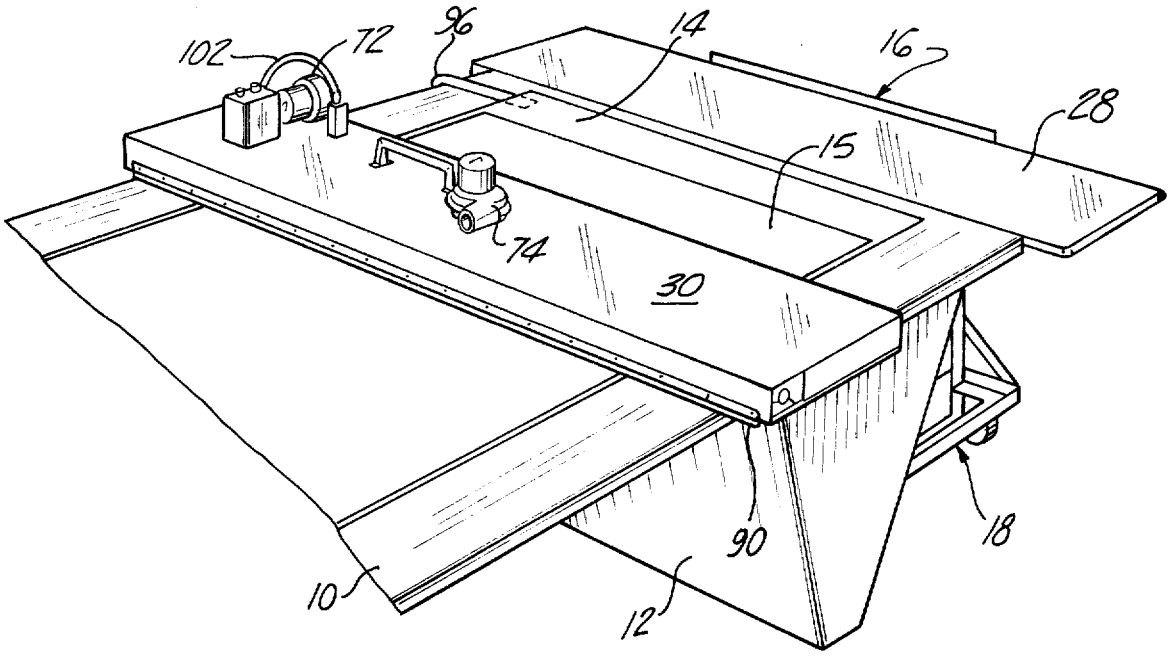
FIG. 1 is a fragmentary perspective view of a drawing table having a loft drawing thereon covered by a sheet of film and showing the apparatus of the present invention being used to make a reproduction of the drawing.

FIGS. 1 through 4 illustrate a drawing table 10 including a supporting leg 12 and having a loft drawing 14 thereon. The table 10 may be of conventional construction and the loft drawing 14 consists of a large metal or synthetic sheet of the kind conventionally used for making drawings of this type. A sheet of film 15 to be exposed covers at least the main portion of the drawing 14.

Figure 2:
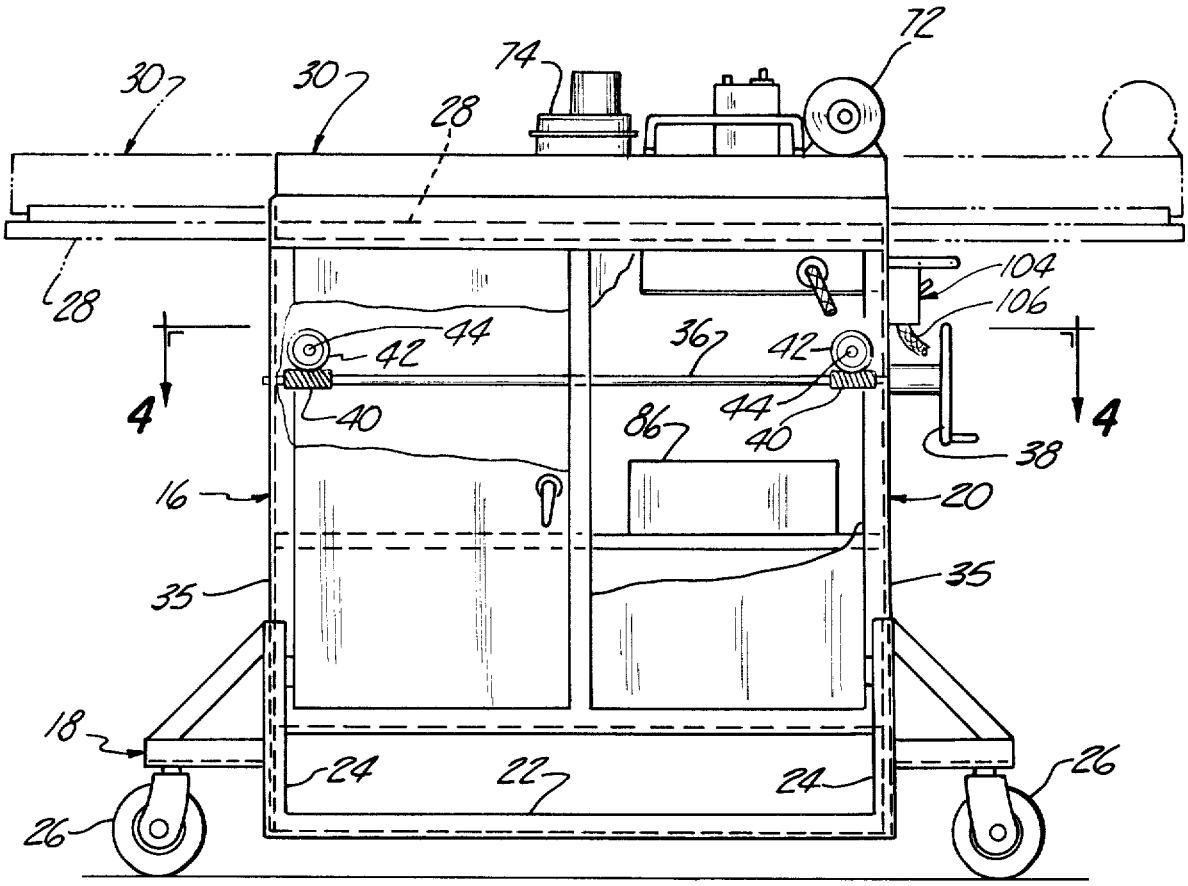
FIG. 2 is an elevational side view of the apparatus with parts broken away for purposes of clarity.
Figure 3:
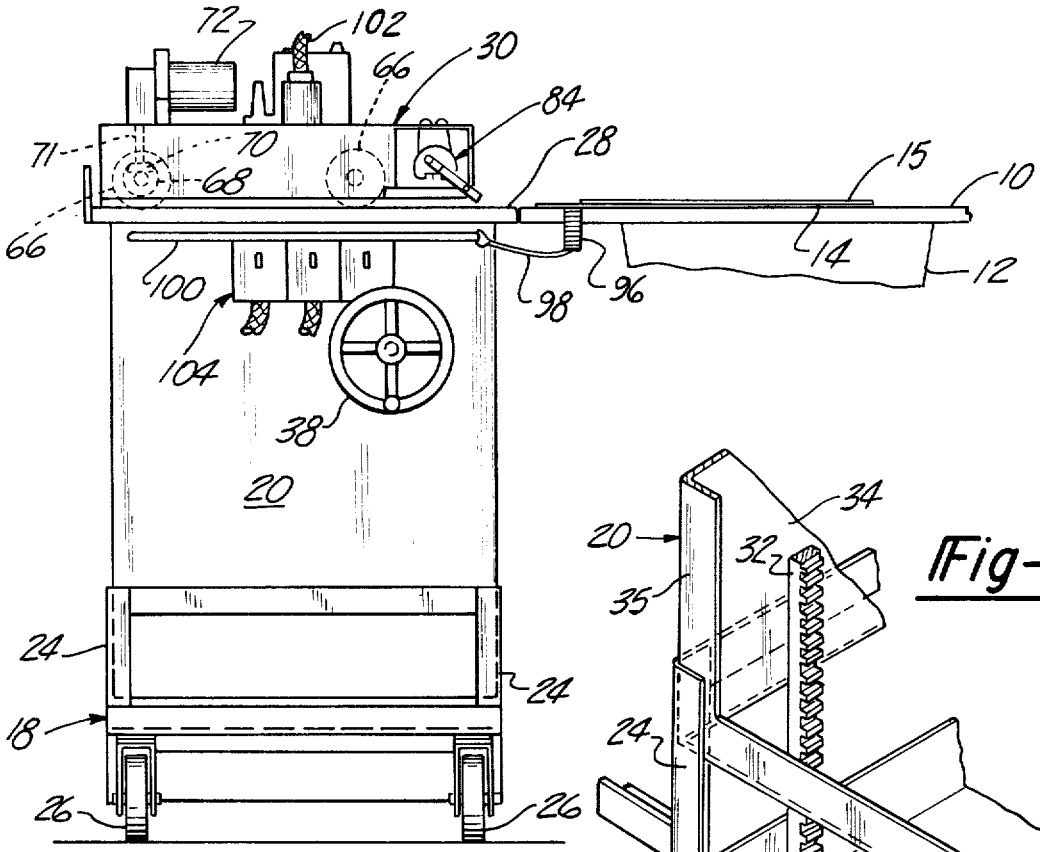
FIG. 3 is an elevational view of the apparatus of FIG. 2 as seen from the right side thereof.

The apparatus of the present invention includes a cabinet structure indicated generally at 16 and comprising a lower carriage unit 18 and a rectangular cabinet 20. The carriage 18 comprises a rectangular framework 22 having vertical corner posts 24 and casters 26 for moving the unit 16 into position at one end of a drawing table as shown in FIGS. 1 and 3. The cabinet includes an upper horizontal supporting platform 28 on which the exposure unit 30 is normally carried. The supporting platform 28 may overextend the ends of the cabinet 20 as shown in FIGS. 1 and 4 and the phantom lines of FIG. 2, or may be substantially the length of the cabinet 20 as in the solid lines of FIG. 2, to carry an exposure unit 30 of any desired length, depending upon the size of the drawing to be reproduced.

Figure 5:
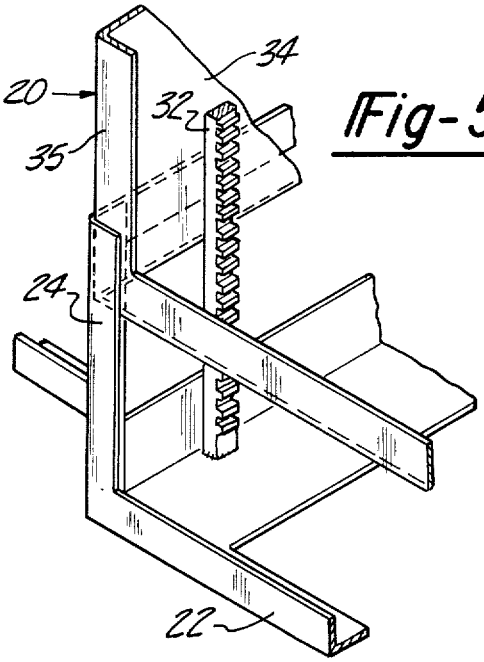
FIG. 5 is a fragmentary perspective view of a portion of the cabinet structure of the apparatus of FIGS. 2–4.
Figure 4:
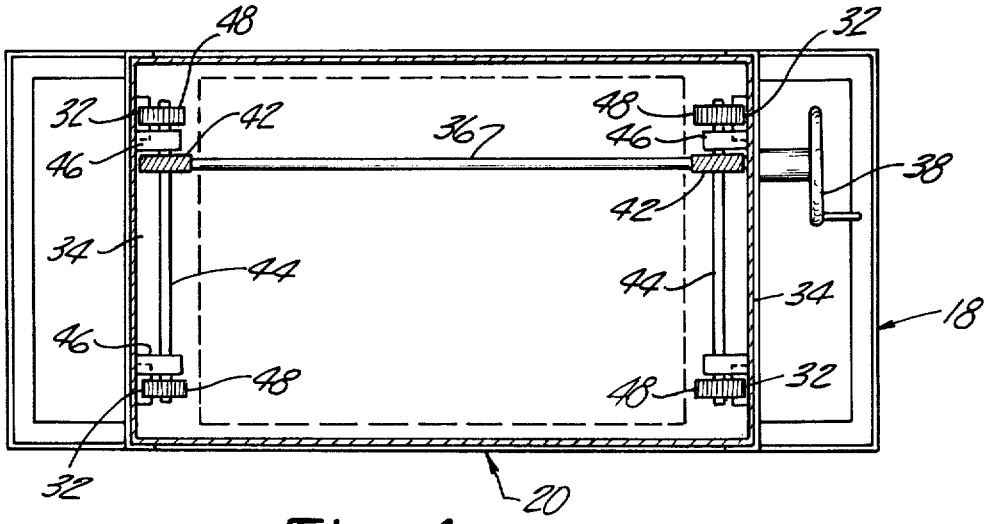
FIG. 4 is a cross sectional view taken substantially on line 4—4 of FIG. 2.

As shown in FIGS. 4 and 5, the framework 22 of the carriage 18 has four vertically extending racks 32 secured thereto and extending upwardly within the side walls 34 of the cabinet unit 20. The corners 35 of the cabinet 20 nest within the vertical corner posts 24 of the carriage 18. A shaft 36 is rotatably journaled in the end walls 34 of the cabinet, and a hand wheel 38 is secured to one end of the shaft 36 exteriorly of the cabinet. A worm 40 meshes with a gear 42 secured on a shaft 44 supported by brackets 46 on the inner sides of the walls 34. At their outer ends the shafts 44 carry pinions 48, each of which meshes with one of the racks 32 so that upon rotation of shaft 36 by the hand wheel 38 the entire cabinet unit 20 will be raised or lowered so that the height of the platform 28 may be made level with the table 10.

Figure 6:
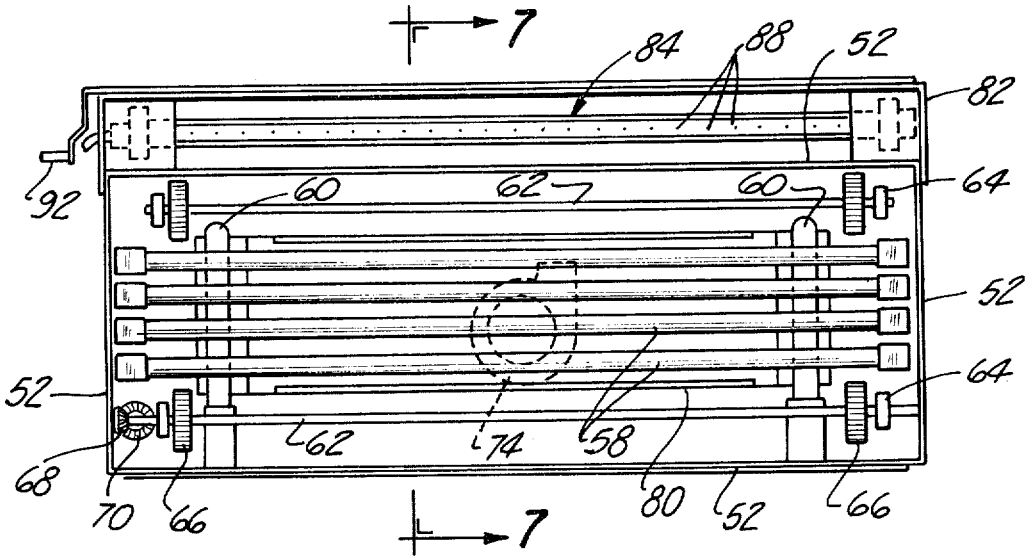
FIG. 6 is a bottom plan view of the exposure unit embodied in the apparatus.
Figure 7:
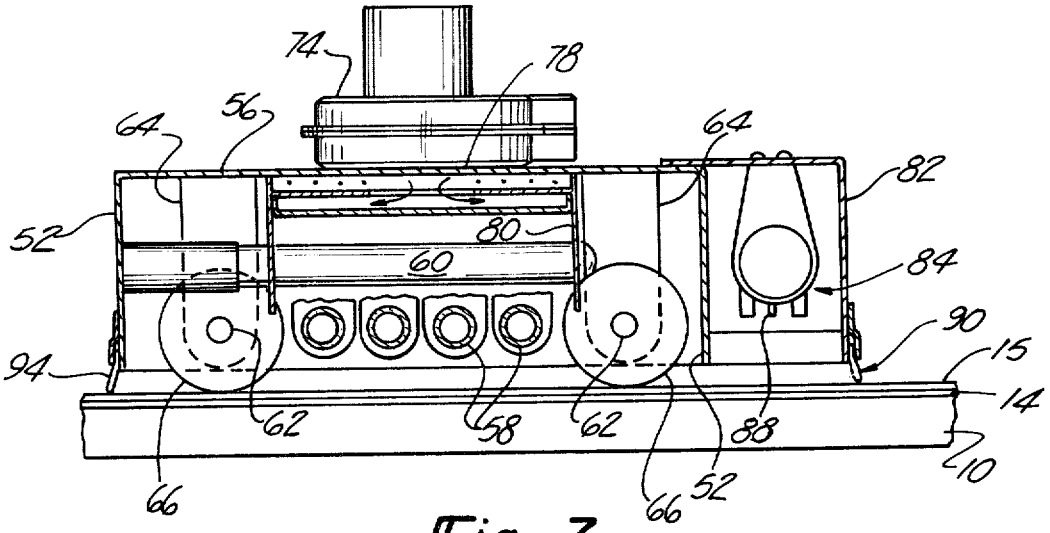
FIG. 7 is a cross sectional view taken substantially on line 7—7 of FIG. 6.

The exposure unit 30, shown in detail in FIGS. 6–8, 50 comprises a generally rectangular box-like structure having side walls 52 and a top wall 56, leaving the bottom open, and is adapted to contain a series of fluorescent tube lights 58 which extend substantially throughout the length of the unit. An additional tube light 60 is disposed above and extends transversely across the lights 58 at each end of the unit to insure sufficient and substantially uniform lighting for proper exposure of the film. A pair of axles 62 are mounted in brackets 64 secured to the under side of the top wall 56 and carry the wheels 66 on which the exposure unit may be moved from the platform 28 across the drawing table and returned. As seen in FIGS. 3 and 6, one of the axles 62 has a bevel gear 68 secured thereto and meshed with a bevel gear 70 having a drive shaft 71 extending upwardly therefrom and journaled in the top wall 56 so as to be driven from an electric motor 72 mounted thereon. The motor 72 is preferably reversible and a suitable speed reduction may be provided between the motor 72 and the wheels 66 to propel the exposure unit 30 at the proper speed for correct exposure of the film or negative. A power cable 102 for supplying current to the motor 72 extends from the exposure unit 30 to the cabinet 20 on which it may be coiled when the unit is not in use.

The exposure unit 30 is provided with a motor driven fan 74 which is adapted to discharge cooling air downwardly through an opening 78 in the top wall 56 over which the fan is disposed. A baffle structure 80 is adapted to direct the cooling air over the lights 58 to prevent their overheating.

At the leading edge of the exposure unit 30 a housing 82 having an open bottom carries an electrostatic discharge electrode 84 electrically connected to an electrostatic control unit 86 mounted in the cabinet 20. The electrode 84 has a series of depending discharge pins 88 which, when the electrode 84 is energized, will discharge an electrostatic flux field along the entire leading edge of the exposure unit in advance of the leading wheels 66 to produce an electrostatic charge between the film 15 and the drawing 14 so the film will be firmly pressed down and smoothed against the drawing to be reproduced to insure accurate exposure of the film. In the case of a synthetic material drawing, the electrostatic charge also serves to flatten the drawing 14 to the surface of the drawing table 10.

Figure 8:
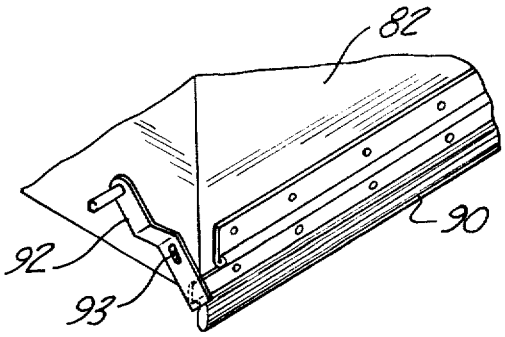
FIG. 8 is a fragmentary perspective view of a portion of the exposure unit of FIGS. 6 and 7.

At its forward lower edge the housing 82 carries a wiper pad 90 made of felt or other suitable material. The pad 90 is sufficiently weighted to firmly engage the film as the exposure unit travels over the film to press out any air pockets that may exist between the film and the underlying drawing prior to their exposure to the electrostatic discharge. The pad 90 may be pivotally mounted along the leading edge of the housing 82, as shown in FIG. 8, and a handle 92 on a pivot pin 93 is provided for lifting the pad 90 at the beginning of an operation so that it can be placed on top of the edge of the film which is first traversed by the exposure unit 30. Another pad 94 of felt or other suitable material extends along the trailing edge of the exposure unit and functions to dissipate the electrostatic charge after exposure of the film has taken place to facilitate separation of the film from the drawing.

An electrical conductor 96 in the form of a metal strap may be hooked over one edge of the drawing table 10 to engage the loft drawing 14 as shown in FIGS. 1 and 3. The conductor 96 is connected by a ground wire 98 to a piece of metal, such as the handle 100 on the cabinet 20, to ground the sheet of metal comprising the loft drawing as well as the drawing table 10, to direct the electrostatic flux field from the electrode 84 toward the drawing 14 and the table 10.

By means of the apparatus described it is possible to make positive reproductions of loft drawings directly from a drawing table without requiring any handling of the loft drawings. The apparatus may easily be moved from one drawing to the next in a drafting room to successively make reproductions from the drawings on all of the drawing tables.

It is possible to make positive reproductions in the manner described under normal lighting conditions. However, it may be advisable under some conditions to block out the film from exposure to the normal lighting in a drafting room and this may readily be accomplished by partially unrolling a roll of opaque cloth (not shown) to cover the film with the roll carried or engaged by the leading edge of the exposure unit so that the cloth will be rolled up as the unit traverses the film. Similarly, a roll or length of such opaque cloth (not shown) may be attached to the trailing edge of the exposure unit to progressively cover the exposed portion of the film.

The apparatus has been described in connection with the reproduction of positives from suitably coated film which is commercially available. It will be apparent that the apparatus could also be used to make negatives rather than positive reproductions, although in making negatives from the original loft drawings in the manner described it would be necessary to carry out such process under controlled lighting conditions.

The electrical controls for the exposure unit 30 may be mounted in any convenient place, either on the exposure unit itself or within the cabinet 20. The power cable 102, shown in FIG. 1, may extend from the exposure unit 30 to suitable control units, as indicated at 104 in FIG. 3, for the various electrical units of the apparatus. A power line 106 shown in FIG. 2 is adapted to be plugged into a conventional source of electrical power and supplies current to the apparatus.

What I claim as my invention is:

1. Exposure apparatus for making a photographic reproduction of a loft drawing or the like supportably overlying a horizontal drawing table surface, comprising a box-like [ structure ] *unit* having an open bottom and containing a light source, a set of wheels on said [ structure ] *unit* on which same is movable over a sheet of light sensitive exposure film covering the drawing to be reproduced, an electrostatic discharge means extending along the leading edge of said exposure unit and constructed to direct an electrostatic charge toward said film and drawing to thereby adhere the film horizontally and smoothly to the drawing as said exposure unit moves thereover to expose said film, a motor for driving said wheels to propel said exposure unit over said film, means for electrically grounding the drawing, and control means for energizing said light source, said motor and said electrostatic discharge means.

2. Apparatus according to claim 1 wherein said electrostatic discharge means comprises an electrode extending along the leading edge of said exposure unit and having a series of spaced, downwardly extending discharge pins thereon.

3. Apparatus according to claim 1 including means extending along the trailing edge of said exposure unit for dissipating the electrostatic charge between the drawing and the exposed film.

4. Apparatus for photographically exposing film overlying a loft drawing or the like, comprising a housing having exposure lighting means, means moving said housing and said drawing with the overlying film relative to each other in close juxtaposition for progressive exposure of said film, [ and ] said housing carrying an elongated electrostatic discharge means ahead of said lighting means for progressively directing an electrostatic flux field to said film and drawing to adhere same together during exposure, and means for progressively dissipating electrostatic charge from said film and drawing following exposure to facilitate separation of said film from said drawing.

5. The apparatus as defined in claim 4 and in which said drawing and film are supported flat on a drawing table surface, and said means moving said housing comprises means driving same over the surface of said table from one end to the other of said drawing.

6. The apparatus as defined in claim 4 and in which said housing comprises a box-like structure having an open bottom of a length to overextend the width of said film, said lighting means being carried in said housing and adapted to direct exposure light from the open bottom onto said film immediately subsequent to electrostatic adherence thereof to said drawing as said housing is moved thereover.

*7. Exposure apparatus for making a photographic reproduction of a loft drawing or the like supportably overlying a horizontal drawing table surface, comprising a box-like unit having an open bottom and containing a light source, a set of wheels on said unit on which it is movable over a sheet of light sensitive exposure film covering the drawing to be reproduced, a means for applying a downward force proximate the leading edge of said exposure unit and adapted to apply such force toward said film and drawing to cause the film horizontally and smoothly to adhere to the drawing as said exposure unit moves thereover to expose said film, and a motor for driving said wheels to propel said exposure unit over said film.*

*8. The combination as set forth in claim 7 wherein said downward force applying means is spaced forwardly of the forwardmost of said set of wheels and a means is operably connected to said downward force applying means for interrupting the downwardly applied force from said film and drawing subsequent to passage of said exposure unit.*

*9. The combination as set forth in claim 8 wherein said downward force applying means comprises an electrostatic discharge electrode supported forwardly of said unit and wherein said means for dissipating said charge comprises a pad of electrical insulating material for dissipating such charge.*

*10. The combination as set forth in claim 9 wherein there is further positioned at the forward edge of said unit a wiper member weighted to engage the film and drawing and to press out in advance any air pockets that may exist therebetween.*

*11. The combination as set forth in claim 10 wherein said exposure unit includes a plurality of longitudinal light tubes extending transversely relative to the path of movement of said unit.*

*12. Exposure apparatus for making a photographic reproduction of a loft drawing or the like supportably overlying a horizontal drawing table surface, comprising a box-like unit having an open bottom and containing a light source, a plurality of wheels on said unit on which it is movable over the surface of a sheet of light sensitive exposure film covering the drawing to be reproduced, means for providing a downward force along the leading edge of said exposure unit to cause the film and drawing to be pressed together and to the drawing table surface, a motor for driving the said wheels to propel said exposure unit over said film, and variable speed controls operatively connected to and controlling the operation of said motor for controlling the exposure time of the apparatus.*

*13. Exposure apparatus for making a photographic reproduction of a loft drawing or the like supportably overlying a horizontal drawing table surface, comprising a box-like unit having an open bottom and containing a light source, a plurality of wheels on said unit on which it is movable over the surface of a sheet of light sensitive exposure film covering the drawing to be reproduced, means for providing a force along the leading edge of said exposure unit to cause the film and drawing to be pressed together and to the drawing table surface, a motor for driving the said wheels to propel said exposure unit over said film, and variable speed controls operatively connected to and controlling the operation of said motor for controlling the exposure time of the apparatus.*

*14. Exposure apparatus for making a photographic reproduction of a loft drawing or the like supportably overlying a horizontal drawing table surface, comprising a box-like unit having an open bottom and containing a light source, a plurality of wheels on said unit on which it is movable over the surface of a sheet of light sensitive exposure film covering the drawing to be reproduced, means for providing a force to cause the film and drawing to be pressed together and to the drawing table surface, a motor for driving the said wheels to propel said exposure unit over said film, and variable speed controls operatively connected to and controlling the operation of said motor thus controlling the exposure time of the apparatus.*

* * * * *

Disclaimer

Re. 28,770.—*Barthel Zeunen*, Clarkston; *Rex C. Grace*, Troy; and *Alvie R. Dunn*, Madison Heights, Mich. PHOTOGRAPHIC EXPOSURE APPARATUS. Patent dated Apr. 13, 1976. Disclaimer filed June 20, 1980, by the assignee, *Capitol Reproductions, Inc.*

Hereby enters this disclaimer to claims 7 and 14 of said patent.

[*Official Gazette August 19, 1980.*]